United States Patent [19]
Quick et al.

[11] Patent Number: 5,212,372
[45] Date of Patent: May 18, 1993

[54] PORTABLE TRANSACTION TERMINAL FOR OPTICAL AND KEY ENTRY OF DATA WITHOUT KEYBOARDS AND MANUALLY ACTUATED SCANNERS

[75] Inventors: Dusty L. Quick, Sodus Point; Jay M. Eastman, Pittsford; John A. Boles, Fishers, all of N.Y.

[73] Assignee: PSC, Inc., Webster, N.Y.

[21] Appl. No.: 756,636

[22] Filed: Sep. 9, 1991

[51] Int. Cl.⁵ .................................... G06K 7/10
[52] U.S. Cl. ............................. 235/472; 341/20; 235/462; 395/99
[58] Field of Search ............... 235/462, 472; 364/513.5; 341/20

[56] References Cited

U.S. PATENT DOCUMENTS

| | | | |
|---|---|---|---|
| 4,722,625 | 2/1988 | O'Brien | 341/20 |
| 4,758,717 | 7/1988 | Wilson . | |
| 4,766,299 | 8/1988 | Tierney | 235/462 |
| 5,015,831 | 5/1991 | Eastman | 235/472 |
| 5,047,952 | 9/1991 | Kramer | 341/20 |
| 5,097,252 | 3/1992 | Harvill | 341/20 |

Primary Examiner—Harold Pitts
Attorney, Agent, or Firm—M. Lukacher

[57] ABSTRACT

To increase the efficiency of personnel conducting inventory management operations, including data entry of products and information as to their absence, presence or location, the operator is provided with a glove having finger sheaths and a portion for the posterior or dorsal surface of the hand which covers that surface. A bar code reader is located in a housing on the cover and flexural strain gauge elements are located in the sheaths in the vicinity of the joints of the fingers. Signals from these elements are digitized and provide for manual data entry and also for commands to operate the bar code reader. The glove and the sensors constitute a portable transaction or data entry terminal which does not require manual actuation of a trigger to operate the bar code scanner or a keyboard for manual entry of data concerning the products to be managed. Electronics for processing signals from the sensors, for operating a display to indicate the data entered upon selective movement of the fingers between flexion and extension and from the bar code reading operations, are all contained in a housing which also contains the bar code reader.

13 Claims, 3 Drawing Sheets

PORTABLE TRANSACTION TERMINAL FOR OPTICAL AND KEY ENTRY OF DATA WITHOUT KEYBOARDS AND MANUALLY ACTUATED SCANNERS

DESCRIPTION

The present invention relates to portable transaction terminals which provide for the entry of data by optical code reading or keyboard entry and particularly to an improved terminal where data entry operations do not interfere with other operations as may be required to handle products thereby reducing the time and increasing the efficiency and productivity in inventory management operations.

The invention is especially suitable for providing a portable transaction or data entry terminal which is battery operated and which may be used to gather data concerning products, both by manual entry of the data and operation of an optical reader of codes containing the data, all of which are embodied in a glove which is worn by the operator on one hand so that the data acquisition and entry operations do not interfere with the use of the hands by the operator to pick and place products in the course of inventory management operations.

Portable transactions terminals, including bar code scanners and readers and keyboards integrated into the terminal to provide a universal device, are in general use for inventory management and control. These terminals include housings for the optics of the scanner and the electronics associated therewith, computers, keyboards and displays. The forms of such terminals vary, but most comprise a trigger operated scanner and a keyboard on the surface of the scanner housing (see U.S. Pat. No. 4,758,717 issued Jul. 19, 1988). Operation of the terminal either to enter data via the keyboard or for manual actuation of the scanner requires operations separate, distinct and apart from the normal operation of personnel which manage inventory such as picking and placing of products in racks. In addition, operators are called on to pull triggers thousands of times in a workday and to actuate keyboards by pressing buttons. Such repetitive motion causes stress and has been found to cause physical injury in certain cases, sometimes called carpal motion syndrome.

It is the principal object of this invention to provide an improved portable transaction terminal for entry of data by code reading or by entering the data, either digits or alphanumeric data without the need for triggers or keys or special manipulations which interfere with the performance by the operator of inventory management tasks such as picking and placing of products.

It is a further object of the present invention to provide an improved portable transaction or data entry terminal where entry of digits*, and code scanning facilities are integrated into a glove which is worn by the operator on one hand and enables the operator to carry on normal operations, such as picking and placing of products on shelves or racks.

*(alpha numeric data, display of data (including operator prompts and instructions)

It is a still further object of the present invention to provide an improved portable transaction terminal which may be implemented in a glove at cost competitive with conventional data entry terminals for similar purposes.

Briefly described, a portable transaction terminal embodying the invention, which does not require manual keyboard or code reader actuation, makes use of a hand receiving glove having a plurality of sheaths for a plurality of fingers and a cover extending rearwardly from the sheaths for the back of the hand. An optical code reader is mounted on the cover for scanning and reading a code at which the hand is pointed. A plurality of sensors are disposed in the sheaths and are responsive to the motion of the joints of the fingers (between flexion and extension) for entering the transaction data and also for actuation of the reader. A character display may also be mounted on the cover, preferably in the same housing as the code reader, for displaying the code which is read. The terminal may also be in communication, as by radio, with a dispatcher for displaying operator prompts. The prompts (a menu of instructions) for the operator which is selected, as by flexing of the fingers, may also be stored in memory of the reader.

The foregoing and other objects, features and advantages of the invention, as well as a presently preferred embodiment thereof will become more apparent from a reading of the following description in connection with the accompanying drawings in which.

Figure 1:
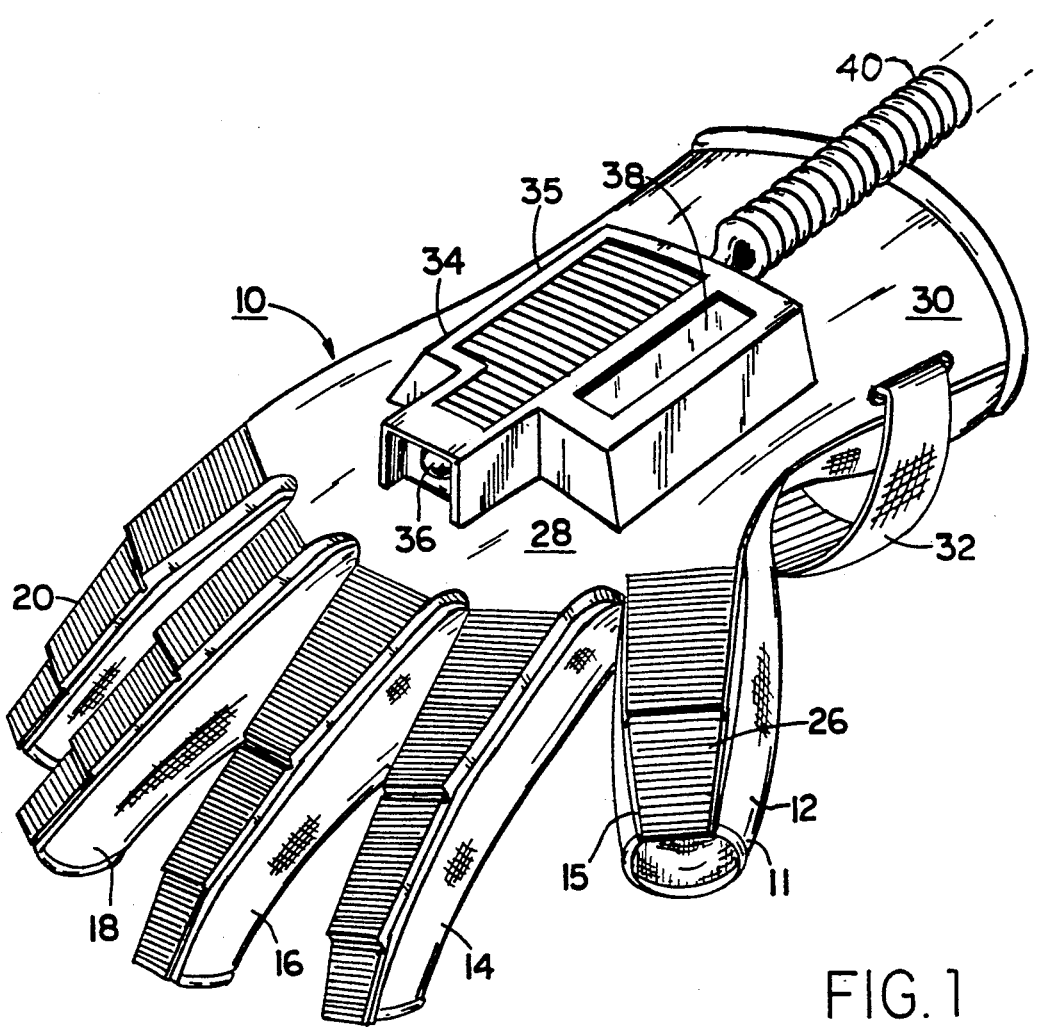
FIG. 1 is a perspective view of glove apparatus providing a portable transaction terminal which embodies the invention.

Referring more particularly to FIG. 1, there is shown a glove 10 having sheaths 11 which contain the thumb 12, the index finger 14, the long finger 16, the ring finger 18 and the small finger 20. These sheaths 11 are provided by strips 15 of flexible plastic material, such as polyethylene having grooves in the vicinity of the interphalangeal joints of the fingers (these grooves for the index finger 14 are shown at 22 and 24 in FIG. 4). These joints are the distal and proximal joints, which are known as the DIP and PIP joints. The DIP joint is the joint below the groove 22 and the PIP joint is the joint below the groove 24. There is another joint in the fingers between the body of the hand (between the dorsal and palmar surfaces thereof) known as the metacarpophalangeal joints which are usually abbreviated as MP joints. There is one joint in the thumb which has a great deal of motion and that is shown below the groove 26. One side of the grooves is higher than the other; providing a "bumper" for protection of the strain gauge pads 50, 52, 54, 56 thereunder.

The top or posterior surface of each finger is covered by the strips 15 of flexible plastic material. This strip extends into a cover section 28 which extends rearwardly from the MP joints (from the fingers) into a gauntlet section 30 which extends over the wrist. The cover section 28 and the strips over the posterior of each finger have attached thereto a cloth material in the shape of the fingers and palm portion of the hand. This fabric is connected, as by heat sealing or sewing, along the edges of the strips covering the fingers and under the cover and gauntlet section 28 and 30. A wrist strap 32, which may have loop connectors (Velcro), may be used to tighten the glove in place.

On the cover 28 is a housing 34 containing a bar code reader or scanner 35, the optical output port of which is shown at 36. A beam of light which scans the code extends through the port and scattered light representing the code which is scanned is received through the port. Such a bar code scanner or reader of the type which is shown in U.S. Pat. No. 5,015,831 issued May 14, 1991 or U.S. patent application Ser. No. 07/543,950 filed Jun. 26, 1990 (now U.S Pat. No. 5,115,120, issued May 19, 1992) in the name of J. M. Eastman is presently preferred because of its miniaturized configuration.

Figure 5:
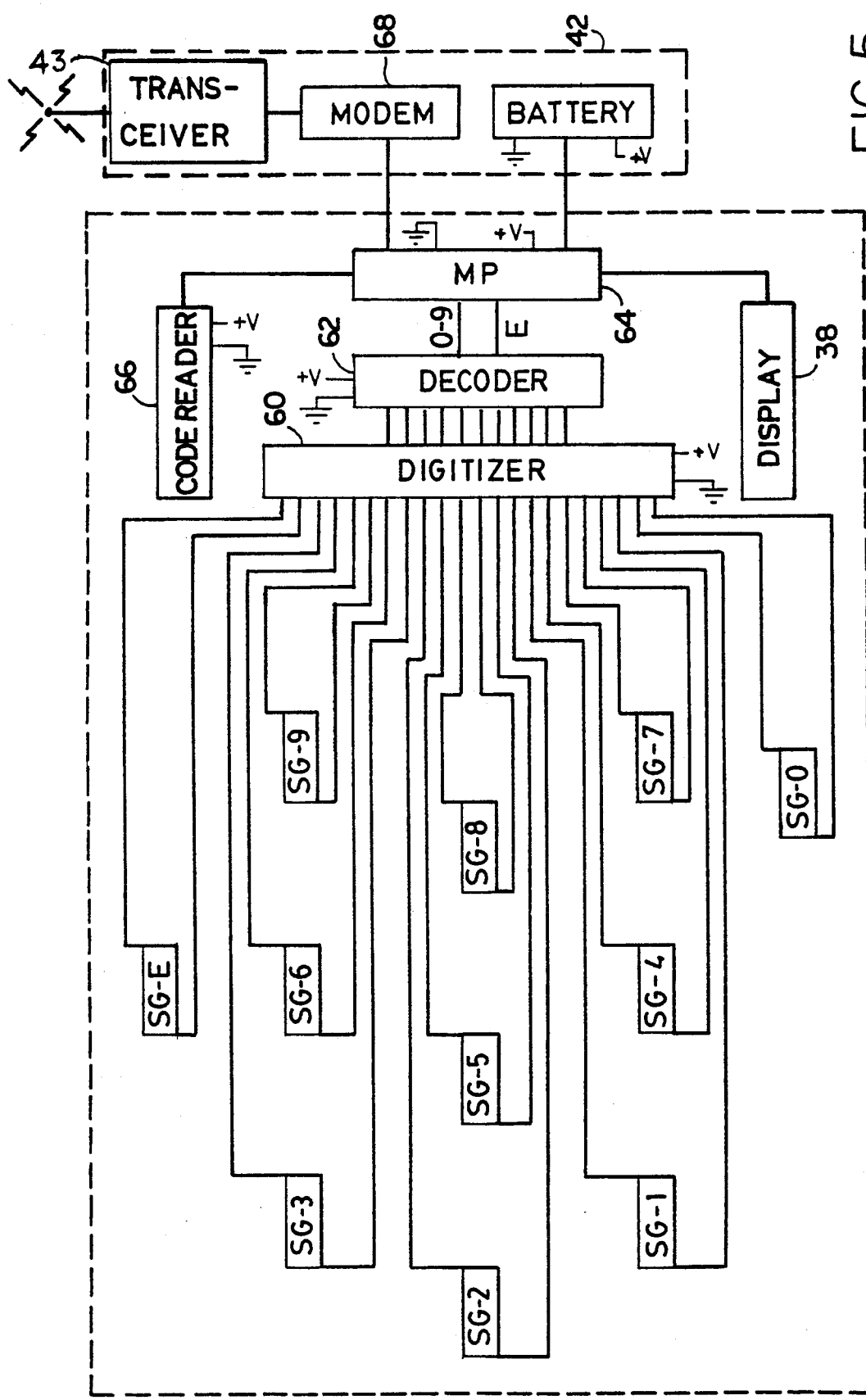
FIG. 5 is a block diagram of the electronic system of sensors and data gathering elements which are integrated into the terminal shown in the preceding figures.

The housing has an opening in which an LCD display showing a plurality of characters of alphanumeric data appears on the top of the housing 34 and is visible to the operator whose hand is in the glove 10. The bar code scanner is connected by a cable 40 to a battery and transmission pack 42 (FIG. 5) which may be carried on the belt of the operator and may contain a transceiver 43 and an antenna for transmission via a radio link of the data collected by the terminal integrated into the glove 10.

Figure 3:
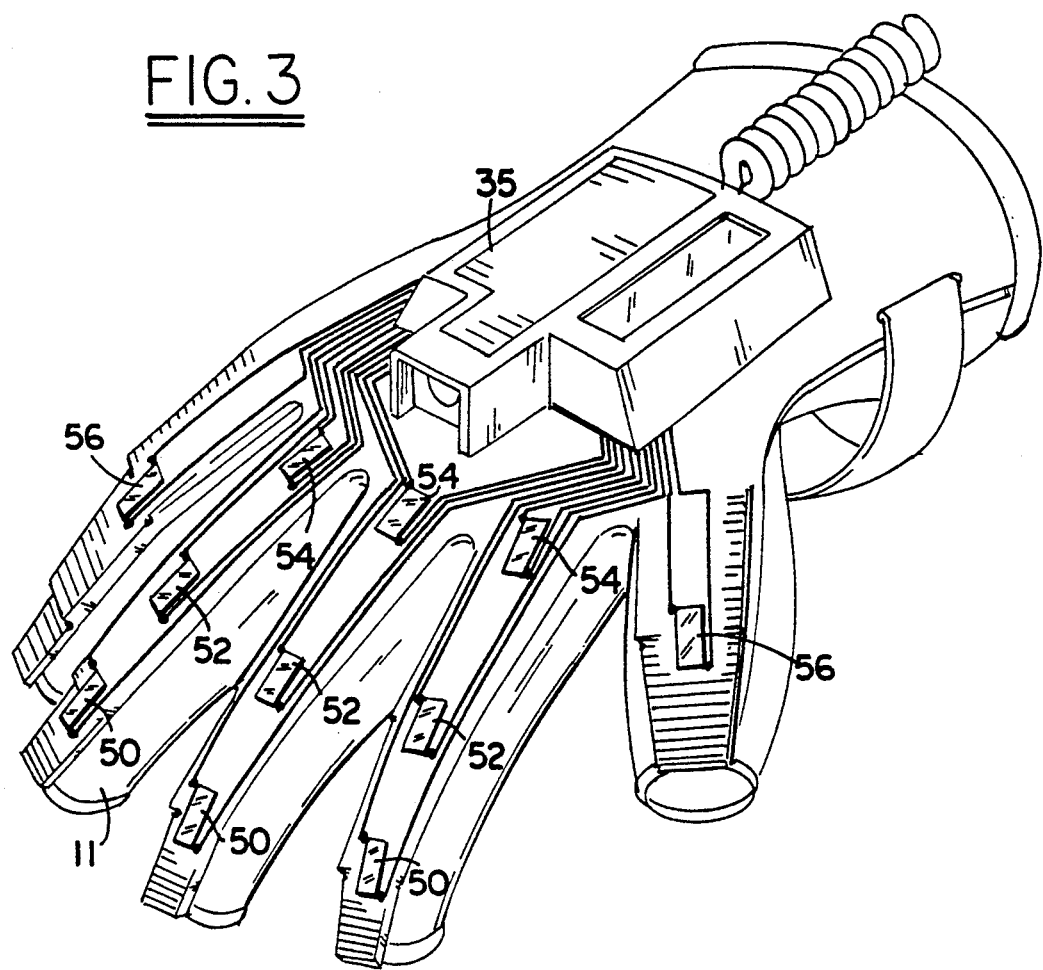
FIG. 3 is a perspective view similar to FIG. 1 wherein the strips on the finger sheaths are removed to illustrate the location of the sensors in the vicinity of the joints of the fingers.

As shown in FIG. 3, there are sensors 50, 52 and 54 embedded in the strips of flexible plastic material sheathing the posterior of the index long and ring finger respectively in the vicinity of the DIP, PIP and MP joints of these fingers. There are single sensors 56 over a joint, suitably the DIP joint of the thumb, and the PIP joint of the small finger. These sensors are strain gauges and may suitably be pads called "force sensing resistors" and sold by Interlink Electronics, 1110 Mark Ave. Carpinteria, Calif. 93013, U.S.A.

Figure 2:
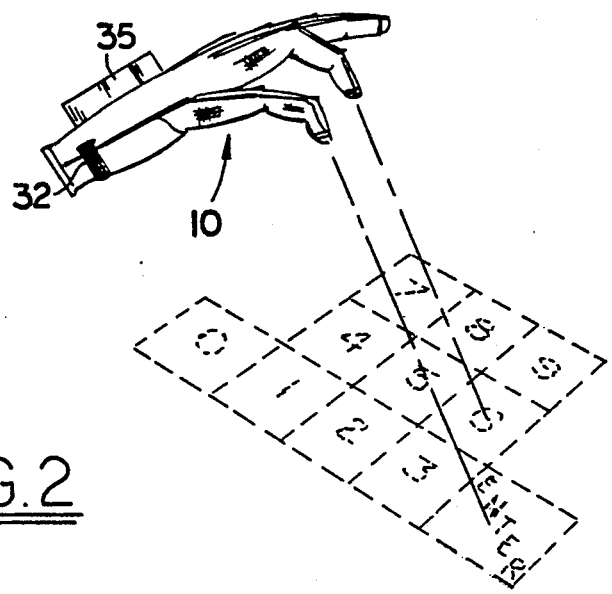
FIG. 2 is a schematic perspective view illustrating the operation of the terminal in entering numerical values and commands.
Figure 4:
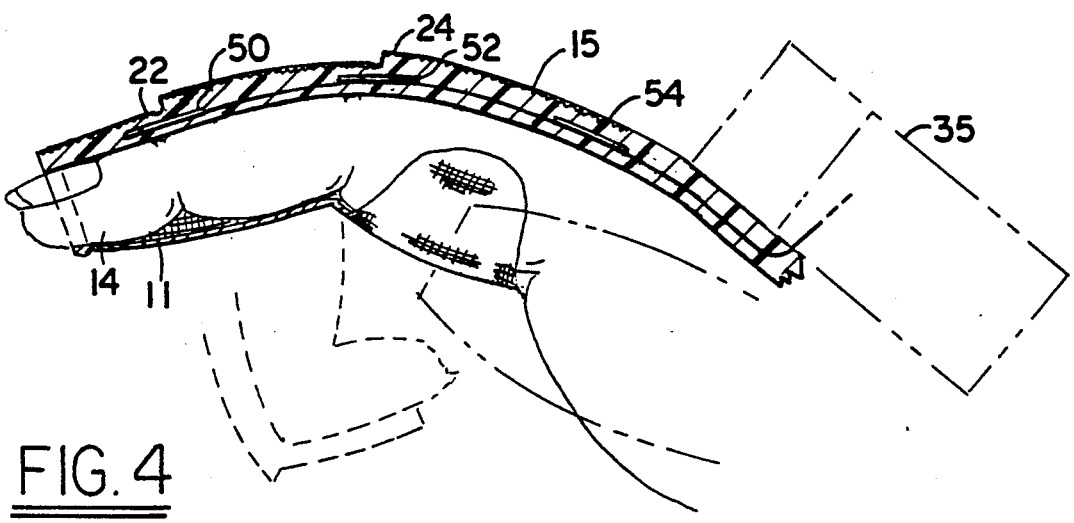
FIG. 4 is a sectional view of the glove in the portion thereof penetrated by the index finger.

As shown in FIGS. 2 and 4, as the index, long and ring finger are selectively bent between the extension position shown in full in FIG. 4 for the index finger and the flexion position shown in the dash line in FIG. 4. The strain gauge pads are therefore selectively bent. A clicker may be embodied in the strips 15 to give a feel or an audible indication of when sufficient bending of the joints occur. There are 11 strain gauge pads in the illustrated embodiment of the invention. Additional strain gauges may be incorporated in the glove, for instance, in the areas of the palm to sense other hand motions, for example, contraction of the palm. The strain gauge pads on the thumb and on the three joints of the index, long and ring finger correspond to the digits 0 to 9 as shown in FIG. 2. The strain gauge pad on the small finger corresponds to an "enter" command. By bending these fingers, signals are generated as current through the strain gauge elements modulated by the strain imposed when the finger is bent. A command to "trigger" (turn on) the reader 35 to energize the light source and the scanning mechanism therein is provided by a closely spaced sequence of enter commands or a combination of finger flexions. In a similar manner, alphabetical characters can be encoded and entered with the terminal, as with combinations of movements, as used in executing sign language for communicating with hearing impaired persons.

These signals are translated in a digitizer 60 (FIG. 5) into data which is decoded in a decoder 62. The decoder has output lines corresponding to the 0 to 9 and E for "enter". It may be desirable, especially where alphanumeric data is to be entered, that the signals from the strain gauge elements be applied to the microprocessor which then includes facility of analog to digital conversion and decoding of the signal combinations corresponding to different numbers and letters in an alphanumeric character set. These output lines are applied to an input port of a microprocessor 64.

The microprocessor, in the illustrated embodiment, has control and data lines to the code reader 66 in the housing 34. When an appropriate code is generated by the flexing, say of the index finger alone accompanied by a flexure of the small finger to enter the data into the microprocessor 64, power is applied from the battery (between plus V and ground) to operate the scanner.

Upon detection of the bar code, a lamp or audible signal denoting a "good read", as is conventional, is provided. The data is entered into memory in the microprocessor 64 and may be stored therein until commanded to be read out as via a modem 68 which receives commands from a host computer via a radio control link using a transceiver 43 optical (e.g., infrared) or acoustic (e.g., ultrasonic) links may alternatively be used. Alternatively, the microprocessor may have an output port which plugs into the host computer for readout of data. The display 38 is also driven by the microprocessor and indicates the code which is read and the digits which are entered by bending of the fingers. It will be apparent that the operator has full control of his or her hands and may pick or place objects pausing only when necessary to actuate the code reader or to enter data by moving the glove fingers between extension and flexion positions.

Preferably, the housing 34 of the code reader 66 contains the microprocessor (including associated memory RAM and ROM), the decoder and the digitizer and the liquid crystal display. These elements are provided by integrated circuit chips mounted on a printed circuit board disposed within the housing 34. The housing 34 may, if desired, be extended to contain the battery and modem. Presently, the use of a separate pack 42 for the battery and modem is preferred. Instructions or prompts for dispatching the operator to different locations (e.g., rack areas where products to be picked up are located) may be transmitted via the radio link and displayed on the display 38. These prompts may alternatively be in a succession (a menu) stored in the memory associated with the microprocessor selected by the operator, by finger manipulations, read out and displayed on the display 38.

From the foregoing description, it will be apparent that there has been provided an improved portable data entry or transaction termination which enables inventory management with higher efficiency and productivity than conventional portable transaction terminals. Variations and modifications in the herein described terminal, within the scope of the invention, will undoubtedly suggest themselves to those skilled in the art. Accordingly, the foregoing description should be taken as illustrative and not in a limiting sense.

We claim:

1. A portable transaction terminal which does not require manual keyboard or code reader actuation, said terminal comprising a hand receiving glove, said glove having areas movable with movements of hand positions, including the fingers thereof, means in said positions for providing signals and response to different ones of said movements and sequences of signals corresponding to sequences of said movements, each movement corresponding to different data and an enter command, an optical code reader mounted on said glove, and means responsive to said signals and sequences thereof for actuating said reader and entering different digits as transaction data in response to said signals and sequences of signals.

2. The terminal according to claim 1 wherein said hand receiving glove has a plurality of sheaths for a plurality of fingers having joints and a cover extending rearwardly from the sheaths for the back of the hand, said optical code reader being mounted on said cover for scanning and reading a code, and a plurality of sensors in said sheaths responsive to the motion of the joints of the fingers for entering transaction data and actuation of said reader.

3. The terminal according to claim 2 wherein said sensors are disposed in the vicinity of said joints and are flexural members which bend with the movement of said fingers from extension to flexion.

4. The terminal according to claim 3 wherein said joints are 11 joints provided by the DIP, PIP and MP joints of the index, long and ring fingers and at least one joint of the thumb and of the small finger, a separate one of said sensors being disposed in the vicinity of 10 of said joints to correspond respectively to different digits the one of said 11 sensors corresponding to an enter command and a reader actuation command.

5. The terminal according to claim 4 wherein said sensor corresponding to said enter command is the sensor associated either with said thumb or said small finger.

6. The terminal according to claim 3 wherein said sheaths have strips of flexible material extending along said fingers across said joints, said sensors having means for providing electrical signals corresponding to strain imposed thereon as said joints bend between flexion and extension, said sensors being embedded in said strips.

7. The terminal according to claim 1 wherein said terminal includes electronic means for processing said sensor signals to provide outputs corresponding at least to the number 0 to 9 and the commands for reader actuation and to enter, computer means responsive to said outputs for storing data corresponding thereto and for translating said outputs into commands for actuation of said reader.

8. The terminal according to claim 7 further comprising a display visually indicating said data and disposed on said cover, said computer means including means responsive to said outputs for displaying said data.

9. The terminal according to claim 8 wherein said computer means includes means for storing data corresponding to codes read by said reader and for operating said display to indicate said data.

10. The terminal according to claim 9 wherein said reader has a housing mounted on said cover in which said reader and said computer means and display are disposed.

11. The terminal according to claim 10 further comprising a battery for powering said computer means, said reader, said display and said sensor signal providing mean.

12. The terminal according to claim 10 further comprising means coupled to said computer for transmitting said data entered by said finger movements and said reader to a location remote from said terminal.

13. The terminal according to claim 8 further comprising means including said computer means for operating said display to indicate instructions for the wearer of the glove.

* * * * *